Dec. 31, 1935.	F. WINKLER	2,026,370
FURNACE FOR SINTERING AND FUSING QUARTZ
Filed Aug. 18, 1934    3 Sheets-Sheet 1

INVENTOR
FRITZ WINKLER
BY Hauff & Warland
ATTORNEYS.

INVENTOR
FRITZ WINKLER

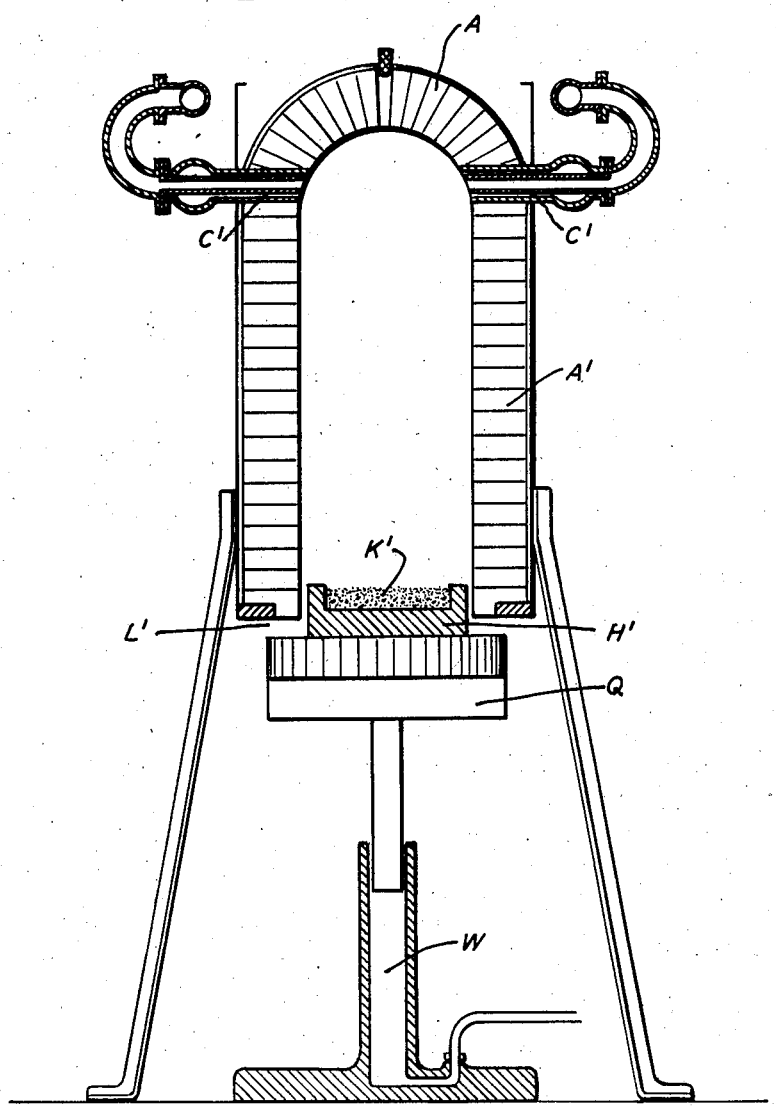

Patented Dec. 31, 1935

2,026,370

UNITED STATES PATENT OFFICE 2,026,370

FURNACE FOR SINTERING AND FUSING QUARTZ

Fritz Winkler, Ludwigshafen-on-the-Rhine, Germany, assignor to I. G. Farbenindustrie Aktiengesellschaft, Frankfort-on-the-Main, Germany Application August 18, 1934, Serial No. 740,411
In Germany November 29, 1929

7 Claims. (Cl. 49—53)

The present application is a continuation-in-part of my copending application Ser. No. 498,588, filed November 28th, 1930, which relates to a process of sintering and fusing quartz and apparatus suitable for said process. The present case particularly relates to several improvements in the construction of this apparatus and to the process carried into effect therewith.

As stated in my said copending application I have found that pure quartz bodies are readily obtained by consolidating fine-grained quartz spread out in a layer of uniform thickness on a substratum of coarser grained quartz by heating it at least to sintering temperature by means of a current of hot gas directed downwards onto it. The quartz to be consolidated is employed in the form of a powder or of small grains of a diameter up to about 2 millimeters. This fine-grained material is spread out in a uniform layer on a substratum of quartz, preferably consisting of several layers of quartz gradually increasing in thickness from about 4 millimeters up to several centimeters. When the uppermost layer of fine-grained quartz has been consolidated either by sintering or fusing a fresh layer of fine-grained quartz may be applied thereto which again is consolidated with the first layer, and thus quartz bodies of considerable thickness may readily be produced. The fine-grained quartz to be employed is preferably rolled and mixed in rotary drums provided with quartz plates before it is employed so that the edges and corners of the grains become ground off and the grains assume a more spherical shape.

The process is preferably carried out in a furnace having a removable bottom on which the layers of quartz are spread out. When it is intended to produce porous quartz bodies in the manner described, it is preferable to carry out the sintering process in a furnace in which the bottom is a cooled grate on which the layers of quartz gradually increasing in thickness are placed and through which the current of hot gas is passed.

Figure 1:
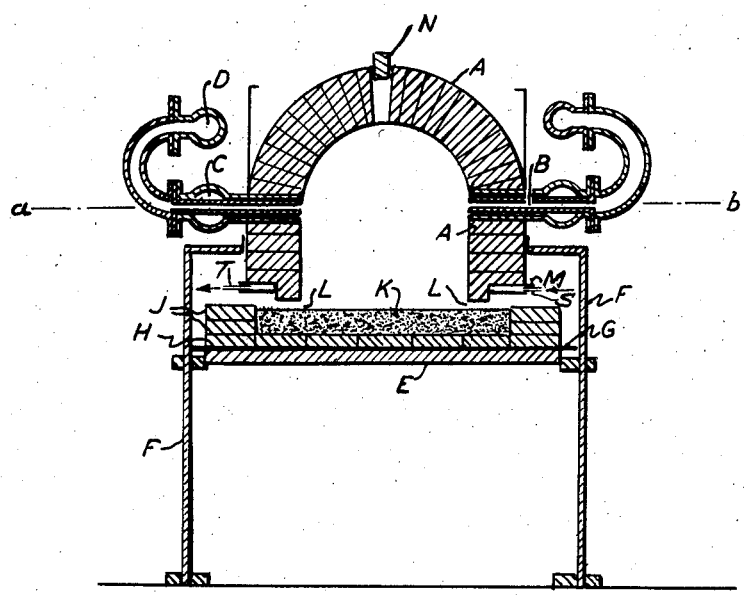
Figure 2:
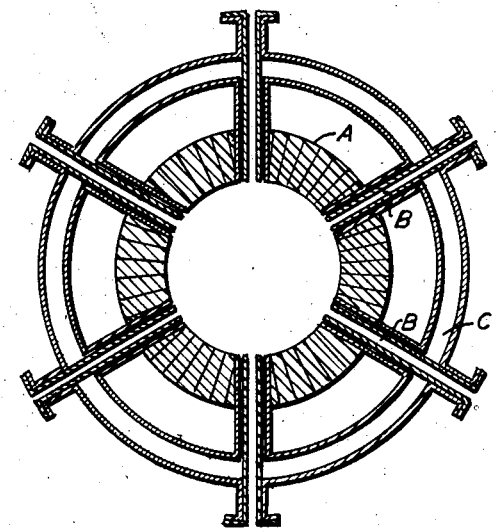
Figure 3:
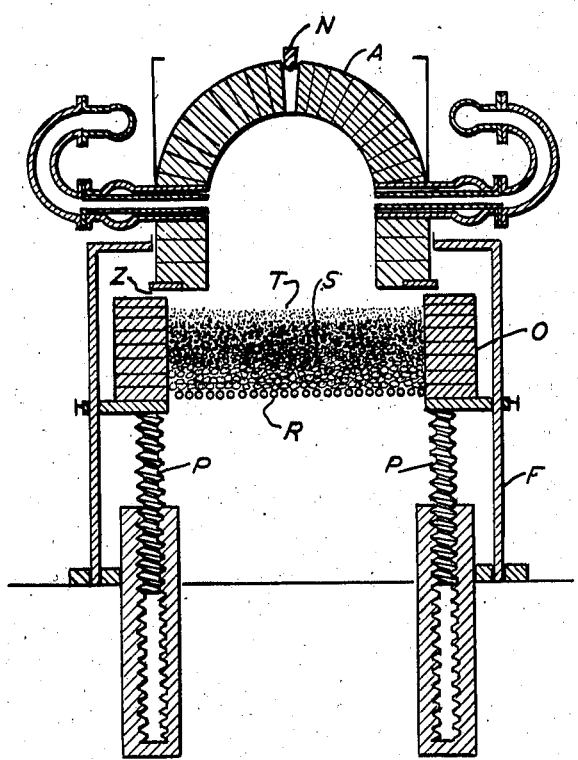

Furnaces suitable for carrying out the process are now described, reference being had to the accompanying drawings of which Figure 1 shows in vertical cross-section a furnace having a removable but impermeable bottom, Figure 2 being a horizontal cross-section on line $a\ b$ of Figure 1. Figure 3 is a vertical cross-section through a furnace having a removable grate instead of the bottom. Figure 4 is a vertical cross-section through a furnace in which a cylinder which is more than twice as high as the diameter of the space surrounded by said cylinder is arranged above the bottom of the furnace.

The furnace shown in Figure 1 is cylindrical at the bottom and closed by a cupola at the top. The cupola is constructed of refractory brick material A, as for example bricks of magnesium oxide, and is supported by stays F which are coated with insulating material to prevent too strong a heating. Gas and air or oxygen are blown from annular pipes C and D through six openings B. The bottom of the furnace consists of a carrier plate E which is secured firmly by means of screws for example to the stays F which support the furnace. For carrying out a quartz fusion, the procedure is as follows:— The screws on the stays F are loosened and the carrier plate E, which in order to prevent warping when heated is built up of six sectors, is allowed to fall to the bottom. Asbestos paper G is then laid on the carrier plate E. A layer of normal silicon carbide bricks H is then laid on the asbestos paper G, and on the bricks H border bricks J of the same material are laid all round. The shallow cylindrical depression having a diameter of 60 centimeters thus formed is filled with fine quartz sand K moistened with water and in a layer 8 centimeters thick. The carrier plate E thus prepared is then raised again to the position shown in the drawings so that all round there is only a gap L of about 2 centimeters between the lower edge of the cupola and the layer of quartz sand K. The support for the quartz sand thus forms the lower closure of the furnace but is not in any way connected to the brickwork A which before the experiment is thoroughly brushed with steel brushes. The furnace is slowly heated up by means of water gas and air, then the air is replaced by a mixture of air and oxygen and finally oxygen alone is blown in instead of the mixture of air and oxygen. To each 50 cubic meters of watergas, at first 22 cubic meters of oxygen and finally only 18 cubic meters of oxygen are blown in per hour. The burners are arranged diametrically opposite to each other in order to prevent the jets of flame from striking the walls of the furnace. The very hot combustion gases escape all round through the gap L at the bottom. The magnesium oxide bricks rest on a hollow ring M which is coated with asbestos and cooled with water introduced at conduit S and withdrawn at conduit T or vice versa. A small opening N in the cupola of the furnace and which normally is closed serves for pyrometrically determining the temperature of the melt. The preparation of the quartz melt is carried out at temperatures of about 1800° C. The fusion process may be observed quite well through the gap L. After shutting off the furnace, the bottom of the furnace is withdrawn. A circular, completely flat quartz plate having a diameter of 60 centimeters and a thickness of 3 centimeters in the middle and 2.5 centimeters at the edge is obtained. The plate is lying on fine quartz sand, which to a certain extent serves as a crucible wall, and is entirely pure. By extending the heating period quartz plates of a thickness of 10 centimeters and more, which are very dense and compact, may be prepared. In these cases the layer of quartz sand should have a thickness of at least 15 centimeters. Grains of quartz, or rock crystal and the like may be used, instead of quartz sand. Likewise comminuted fused quartz may be used. Since the furnace allows of rapidly removing the white hot quartz plates the latter may be formed while still plastic by pressing, rolling or bending.

Optical glasses for lenses, mirrors and the like of quartz may be prepared in the manner hereinbefore described. Quartz plates of large dimensions may also be prepared, because furnaces of the said kind may be constructed having diameters of 3 meters and more. Even in these large furnaces the uniform heating of the middle of the bottom of the furnace offers no difficulty because the radiation of heat takes place from the cover of the furnace to the bottom.

The furnace suitable for producing porous quartz bodies will now be described reference being had to Figure 3:

Into the upper part of the furnace constructed of refractory brick material A heating combustion gas and oxygen or air enriched with oxygen are blown in all round through nozzles. The furnace rests on supports F to which is attached a framework O containing the quartz charge and which may be raised or lowered by means of screws P. The framework O comprises at its lower part a grate consisting of water-cooled iron tubes R. Various layers of quartz S are arranged on these iron tubes, firstly pieces of quartz having a diameter of about 5 centimeters, secondly pieces of a diameter of 3 centimeters, then of a diameter of 1½ centimeters and then those of a diameter of ½ centimeter. After covering these with grains about 2 millimeters in diameter, a layer T about 6 centimeters thick of quartz grains only 1 millimeter in diameter is arranged on the top. In order to ensure a uniform passage of the hot gases through the quartz layer and thus to obtain a uniform sintering of the fine quartz grains while maintaining the porosity it is important that the building up of the quartz layer shall be carried out carefully and especially that the grains having a diameter of 1 and 2 millimeters shall be well sieved. The layer of grains 1 millimeter in diameter consists preferably of quartz which has already been fused. The remaining pieces of quartz may consist of quartzite. The entire quartz layer is held in position by zirconium bricks built all round. The furnace, which has an internal diameter of 50 centimeters, is first heated to 1200° C. with 50 cubic meters of water-gas and 50 cubic meters of air after the framework O together with the layer of quartz has been moved up until there is a gap Z of 4 centimeters between it and the cupola. The gap Z is then reduced to about 2 centimeters. The heating gases then pass partly through the layer of quartz grains and leave the furnace through the grate R. After about an hour, 8 cubic meters of oxygen are added per 50 cubic meters of water-gas and the gap Z is reduced to 0.5 centimeter. The temperature then rises to 1550° C. as can be observed with the aid of a pyrometer through the opening N and the pieces of quartz glass commence to join together on the surface. A straight quartz glass rod kept in the furnace at this temperature bends down after about 4 minutes. After the temperature of about 1500° C. has been maintained for about half an hour the bottom of the furnace is lowered 50 centimeters. The resulting porous plate 50 centimeters in diameter and 2 centimeters in thickness is carefully lifted off still red hot with the aid of 2 quartz plates inserted thereunder. Grains of quartz glass 1 millimeter in diameter are then placed on top of the remaining quartz substratum until the layer is at its original height and the bottom of the furnace is again raised to within 0.5 centimeter of the upper part. After 2 hours another plate may be withdrawn. Each time after applying the layers of quartz grains 1 millimeter in diameter the gap Z should not at first be made too narrow. The quartz layer should first be heated to a temperature of about 1400° C. until the upper quartz grains are lightly joined together since otherwise the grains 1 millimeter in diameter may be blown away by the gases escaping through the gap Z.

If it is desired to prepare a very fine-grained body of quartz, such as is necessary for filtering purposes, a layer of grains 1 millimeter in thickness already prepared is used as the substratum. A thin layer of quartz glass grains 0.5 millimeter in diameter is strewn on the white-hot layer of grains 1 millimeter in diameter and this is sintered in the manner described. A layer of still finer quartz grains is then applied to this and sintered in the same manner.

The process may also be employed for the preparation of large porous quartz articles having diameters of 1 meter and more. Furthermore, a layer of pieces of quartz glass may be shaken on to the already sintered article and porous plates 50 centimeters and more in thickness may thus be prepared.

The porous plates prepared according to the invention may be employed as substrata for optical mirrors, for reflectors for astronomical purposes and the like.

I have now found as a development of the said invention that the aforedescribed furnaces comprising a cupola of refractory material and in which the hot gases may escape downwardly through the grate or through gaps at the sides or through both, are advantageously so constructed that the said cupola is erected on an upright cylinder the height of which is at least as great as its inner diameter, the support, such as grate or compact plate, on which the materials to be heated rest, being below the said cylinder. The support may be lifted and lowered to close the gap between this support and the said cylinder. As already stated before it is also preferable to arrange the burners diametrically opposite to each other in order to prevent the jets of flame from striking the walls of the furnace. To this end it is of advantage to provide for an as exact as possible diametrically opposite position of the burners and furthermore to arrange these burners so that the combustion gases issuing from each of two opposite burners meet in the forcus of the cupola, which latter feature may be easily attained by directing the burners to the said focus. In this manner a very intense and even radiation on the materials resting below on the support takes place which in the aforesaid case of fine grained quartz effects an even melting or sintering. By the beforementioned minimum height of the cylinder supporting the cupola turbulences arising from the opposite gas streams meeting in the focus substantially disappear before touching the materials to be heated so that the gas leaves the furnace very uniformly.

Figure 4 of the accompanying drawings illustrates a preferred embodiment of these particular features of the apparatus according to the invention.

In the said Figure 4 A denotes the cupola of the furnace which as well as the cylinder A' consists of burnt stones of magnesium oxide. As may be seen from the drawings the said cylinder A' is somewhat more than twice as high as the inner diameter of the furnace. C' are the burners (six in number) which are arranged exactly diametrically opposite to each other in the manner shown in Figure 2, but somewhat above the place at which cylinder A' joins the cupola A so that they are directed to the focus of the cupola. In this manner it is attained that the six flames meet in the said focus and there form a flame ball. The hot gases which in this flame ball are in a turbulent motion become non-turbulent during the passage through the cylinder A' and uniformly escape to all sides from the furnace by gap L' situated between the base of the cylinder and the movable piston Q on which rests the support H' consisting of graphite and supporting a cylindrical layer of quartz sand K'. By the radiation of the flame ball in the focus and by the said uniform escape of the combustion gases a very uniform heating of the quartz sand K' takes place. It is thus possible to melt a layer of quartz sand of about 20 millimeters thickness by combustion of water gas with oxygen within a time of 15 minutes to form a solid whitish transparent quartz plate the thickness of which is quite uniform. The piston Q may be readily lifted or lowered in cylinder W by means of compressed oil. This is important for instantaneously further working up the white hot plasic quartz plate.

What I claim is:—

1. Furnace suitable for sintering quartz, comprising a cupola of refractory material, gas inlets in said cupola, a cylindrical wall of refractory material supporting said cupola, a movable bottom below the space surrounded by said wall and means for lifting and lowering said bottom.

2. A furnace as claimed in claim 1 in which the bottom is a grate surrounded by a wall of refractory material.

3. A furnace as claimed in claim 1 in which the bottom is a compact plate.

4. A furnace as claimed in claim 1 in which the height of the cylinrical wall of refractory material supporting the cupola is at least as great as the diameter of the space surrounded by said wall.

5. A furnace as claimed in claim 1 in which the height of the cylindrical wall of refractory material supporting the cupola is more than twice as great as the diameter of the space surrounded by said wall.

6. Furnace suitable for sintering quartz, comprising a cupola of refractory material, gas inlets in said cupola directed to the focus of said cupola, a cylindrical wall of refractory material supporting said cupola, and having a height at least as great as the diameter of the space surrounded by said wall, a movable bottom below the space surrounded by said wall, and means for lifting and lowering said bottom.

7. A furnace as claimed in claim 1 in which the means for lifting the movable bottom comprise a piston, in a cylinder, driven by compressed oil.

FRITZ WINKLER.